(12) United States Patent
Pangle et al.

(10) Patent No.: US 7,762,075 B2
(45) Date of Patent: Jul. 27, 2010

(54) COMBUSTION LINER STOP IN A GAS TURBINE

(75) Inventors: Ansley Michelle Pangle, Pickens, SC (US); Jeffrey Scott Lebegue, Simpsonville, SC (US); Todd Daniel Paquin, Easley, SC (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 11/838,506

(22) Filed: Aug. 14, 2007

(65) Prior Publication Data

US 2009/0044540 A1   Feb. 19, 2009

(51) Int. Cl.
*F02C 1/00* (2006.01)
(52) U.S. Cl. .......................................... 60/752; 60/796
(58) Field of Classification Search ............... 60/752, 60/760, 39.31, 39.32, 796
See application file for complete search history.

(56) References Cited

U.S. PATENT DOCUMENTS

| | | | |
|---|---|---|---|
| 5,265,411 A * | 11/1993 | Belsom | 60/796 |
| 5,323,600 A | 6/1994 | Munshi | |
| 5,749,218 A * | 5/1998 | Cromer et al. | 60/796 |
| 6,216,442 B1 | 4/2001 | Belsom et al. | |
| 6,279,313 B1 | 8/2001 | Lawen, Jr. et al. | |
| 6,912,838 B2 * | 7/2005 | Sileo et al. | 60/39.37 |
| 7,082,766 B1 * | 8/2006 | Widener et al. | 60/752 |
| 2001/0046651 A1 * | 11/2001 | Steber et al. | 431/352 |

* cited by examiner

*Primary Examiner*—Michael Cuff
*Assistant Examiner*—Phutthiwat Wongwian
(74) *Attorney, Agent, or Firm*—Cantor Colburn LLP

(57) ABSTRACT

A liner stop for retaining a liner within a sleeve of a combustion system, includes: a female component including a saddle, the female component adapted for coupling to one of the liner and the sleeve; a male component including a tab for insertion into the saddle, the male component adapted for coupling to an opposite one of the liner and the sleeve; and an insert adapted for being attached to the tab and ensuring dampening of vibration when the tab is disposed within the saddle. A method and a system are also disclosed.

16 Claims, 4 Drawing Sheets

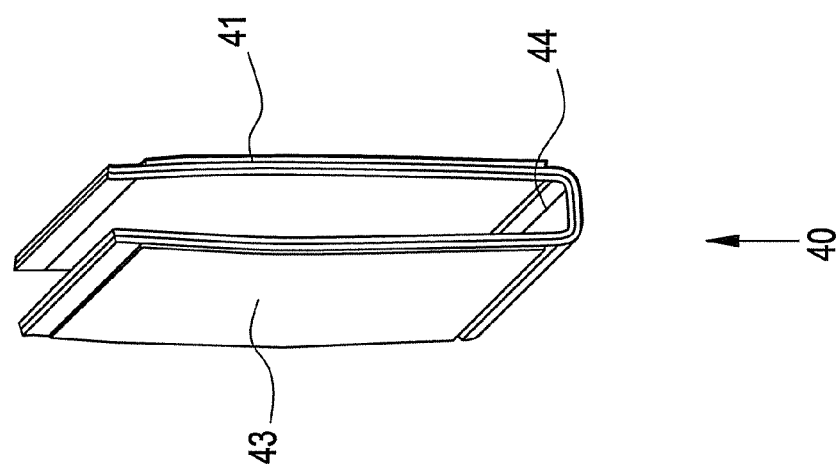
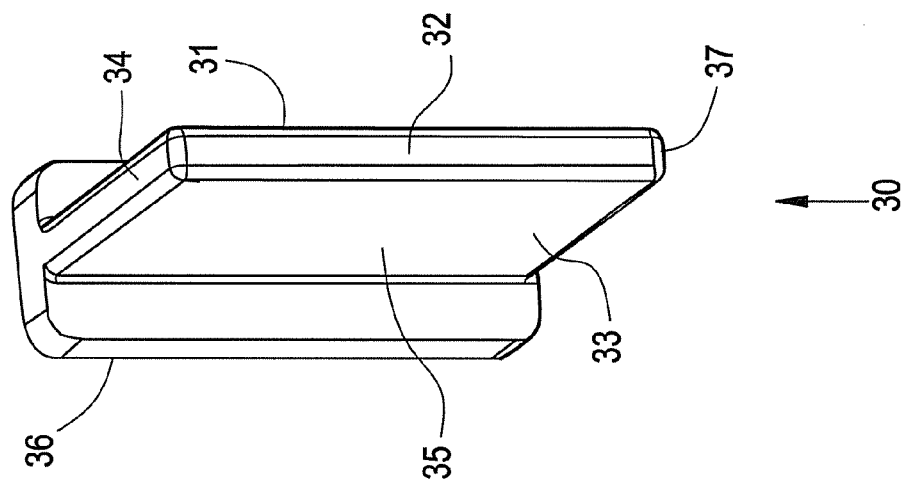
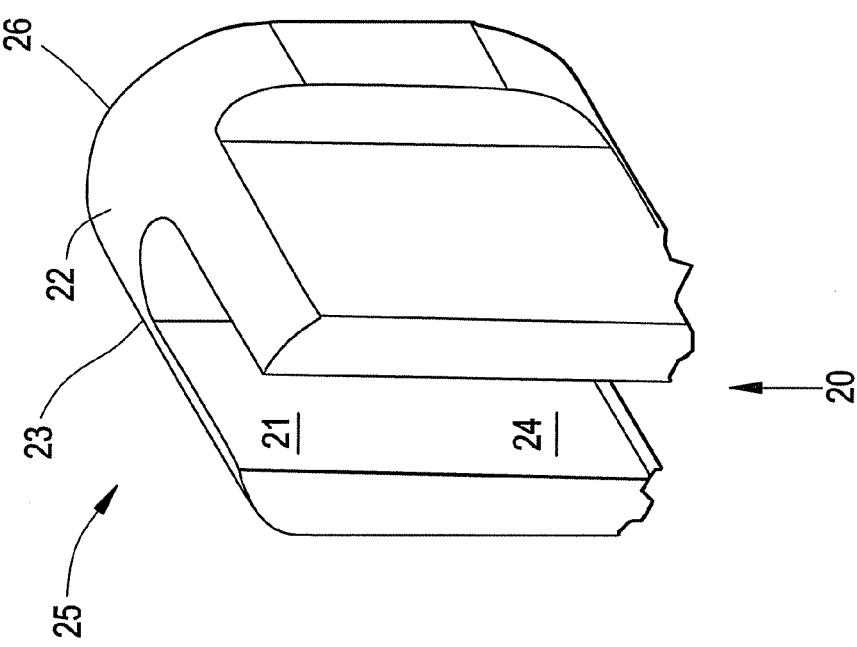

COMBUSTION LINER STOP IN A GAS TURBINE

BACKGROUND OF INVENTION

1. Field of the Invention

The present invention relates to combustion chambers in gas turbine engines, and in particular, the invention relates to mounting and alignment of combustion liners within the combustion chambers of gas turbines.

2. Description of the Related Art

The combustion system of a gas turbine generates hot gases to drive a turbine. The turbine, in turn, drives a compressor that provides compressed air for combustion in the combustion system. In addition, the turbine produces usable output power. A combustion system for a gas turbine may be configured as a circular array of combustion chambers arranged to receive compressed air from the compressor, inject fuel into the compressed air to create a combustion reaction, and generate hot combustion gases for the turbine. Each cylindrical combustion chamber includes one or more fuel nozzles, a combustion zone within the combustion liner, a flow sleeve surrounding and radially spaced from the liner, and a gas transition duct between the combustion chamber and turbine.

The combustion zone is a volume within the combustion liner in which the fuel/air mixture combusts to generate the hot gases. Compressed air flows from the compressor to the combustion zone through an annular gap between the combustion liner and flow sleeve. Air flowing through this gap cools the outer surface of the liner and flows into the combustion zone through holes in the combustion liner. Compressor air flows between the liner and flow sleeve in a first direction, reverses direction as it enters the combustion liner, and flows as a hot gas in an opposite direction out of the liner and combustor, and to the turbine.

The combustion liner operates in a high temperature environment in which a roaring combustion process generates a stream of high-velocity hot gases that flow through the liner and to the turbine. Heat and vibration from the combustion processes, as well as other mechanical loads and stresses from the gas turbine shake, rattle and otherwise vibrate the combustion liner, flow sleeve and the other components of the combustion chamber. Accordingly, the combustion liner should be mounted in the flow sleeve to withstand the heat, vibration and loads imposed by the combustion of gases and other forces that act on the combustion chamber.

Liner stops mount the combustion liner concentrically within the combustion flow sleeve. Three liner stops are typically arranged around on the outer surface of the combustion liner, and bridge a gap between the liner and flow sleeve. Each liner stop on the combustion liner mates with a matching liner stop on an inside surface of the flow sleeve. The liner stops align the liner within the flow sleeve, and with respect to the fuel nozzles and other components of the combustion chamber.

Prior liner stops have had difficulty in aligning the combustion liner in the flow sleeve, especially during assembly of the combustion system. During assembly, the combustion liner is inserted into the cylindrical flow sleeve. The liner is held into place by three liner stops and a hula seal. The liner stops on the combustion liner fit into the matching liner stops in the flow sleeve. When the combustion liner is assembled into the flow sleeve the hula seal engages before the liner stop on the combustion liner can be inserted into the matching liner stops on the flow sleeve. As a result the stops are not allowed to self align as the liner is inserted into the flow sleeve. A misalignment between the liner and flow sleeve often resulted in the liner stops being non-uniformly loaded. This requires the liner to be adjusted after being installed into the flow sleeve, which is difficult and time consuming given the liner is held into place by the hula seal. In addition, the potential for misalignment between the combustion liner and flow sleeve has resulted in a relatively-high number of defects in combustion systems.

The liner stops support the liner during the extreme vibration and heat that result from combustion within the combustion liner. Vibration and thermal deformations due to the combustion process cause the liner, flow sleeve, and other components of the combustor to vibrate and otherwise move with respect to each other. In particular, the combustion liner thermally deforms and vibrates with respect to the flow sleeve and fuel nozzle. Accordingly, the liner stops should maintain the alignment between the liner, sleeve and flow nozzle despite the vibration forces and deformation inherent in a combustion system.

Prior combustion liner stops suffered from excessive wear of their contacting surfaces. The contact surfaces in liner stops are those surfaces of the male and female stops that are in rubbing contact when the liner is in the flow sleeve. The contacting surfaces in the liner stops support the weight of the combustion liner, and transfer vibration and other dynamic forces between the liner and flow sleeve. These contacting surfaces should also withstand the wear that results as these surfaces rub together. During operation of the combustion system, the liner stops may develop a wear cycle of increasing surface wear, which allows for greater vibratory movements between the liner stops, and which in turn causes even more surface wear.

The vibration/wear cycle of the liner stops can continue until the contacting surfaces wear through and the liner stops fail. When liner stops wear through and fail, the wearing surfaces in the combustion chamber may shift away from the liner stops to other surfaces that are not intended to be in rubbing contact. Similarly, unintended contact between surfaces in the combustion chamber may result due to misalignment as the combustion liner is inserted into the flow sleeve. If the wearing surfaces in a combustor shift away from the liner stops, then the surfaces of, for example, the combustion liner and fuel nozzles may come into rubbing contact. The surfaces of the liner and fuel nozzle are not designed or intended to support the combustion liner or to withstand the rubbing wear that occurs during vibration. When the contacting surfaces shift from the liner stops to other combustor chamber components, the cycle of wear and vibration may continue rapidly until the combustor fails, or until a sufficient clearance develops between the new rubbing surfaces to give way and allow the rubbing surfaces to transfer back to the liner stops or other combustor component. Even when the rubbing contact shifts back to the liner stops, wear damage to the liner, nozzles or other combustion components may cause premature failure of the combustion chamber.

Excessive wear between the liner stops, combustion liner and flow sleeves requires frequent maintenance inspections of the liners and stops and can lead to combustor failure. In the past, excessive wear of liner stops has necessitated that gas turbines be regularly shut down to inspect and replace worn combustion components and, in particular, liner stops.

Accordingly, there is a need for combustion liner stops that allow for easy alignment of the combustion liner and flow sleeve during assembly, provide vibration resistant support for the sleeve and do not fail due to vibratory wear. Preferably, such liner stops are easy to install and maintain.

BRIEF DESCRIPTION OF THE INVENTION

In one embodiment, a liner stop for retaining a liner within a sleeve of a combustion system, is disclosed and includes: a female component including a saddle, the female component adapted for coupling to one of the liner and the sleeve; a male component including a tab for insertion into the saddle, the male component adapted for coupling to an opposite one of the liner and the sleeve; and an insert adapted for being attached to the tab and ensuring dampening of vibration when the tab is disposed within the saddle.

In another embodiment, a method for inserting a liner into a sleeve of a combustion system, is disclosed and includes: installing one of a male component and a female component onto an outer surface of the liner; installing an opposite one of the male component and the female component onto an inner surface of the sleeve; installing an insert onto a tab of the male component; and inserting the liner into the sleeve such that the tab becomes disposed within a saddle of the female component.

In a further embodiment, a combustion system including a liner inserted into a sleeve, is disclosed and includes: a plurality of liner stops disposed between the liner and the sleeve, each liner stop including a female component including a saddle, the female component adapted for coupling to one of the liner and the sleeve; a male component including a tab for insertion into the saddle, the male component adapted for coupling to an opposite one of the liner and the sleeve; and an insert adapted for being attached onto the tab and ensuring retention of the liner within the sleeve and dampening of vibration when the tab is disposed within the saddle.

BRIEF DESCRIPTION OF THE DRAWINGS

FIG. 2 provides a perspective view of a female component of the liner stop;

FIG. 3 depicts a perspective view of the male component of the liner stop;

FIG. 4 depicts a perspective view of an insert of the liner stop;

DETAILED DESCRIPTION OF THE INVENTION

Disclosed is a liner stop that provides for at least one of installation and wear mitigation at the interfaces of a combustion liner and a flow sleeve within a combustion system, such as a gas turbine. The function may be provided by use of a plurality of liner stops which are generally disposed in an even distribution within the liner and the flow sleeve. The liner stop provides, as a result of the addition of an insert for increased damping of vibrations caused by rotor and combustion dynamics and increased ease of installation.

Figure 1:
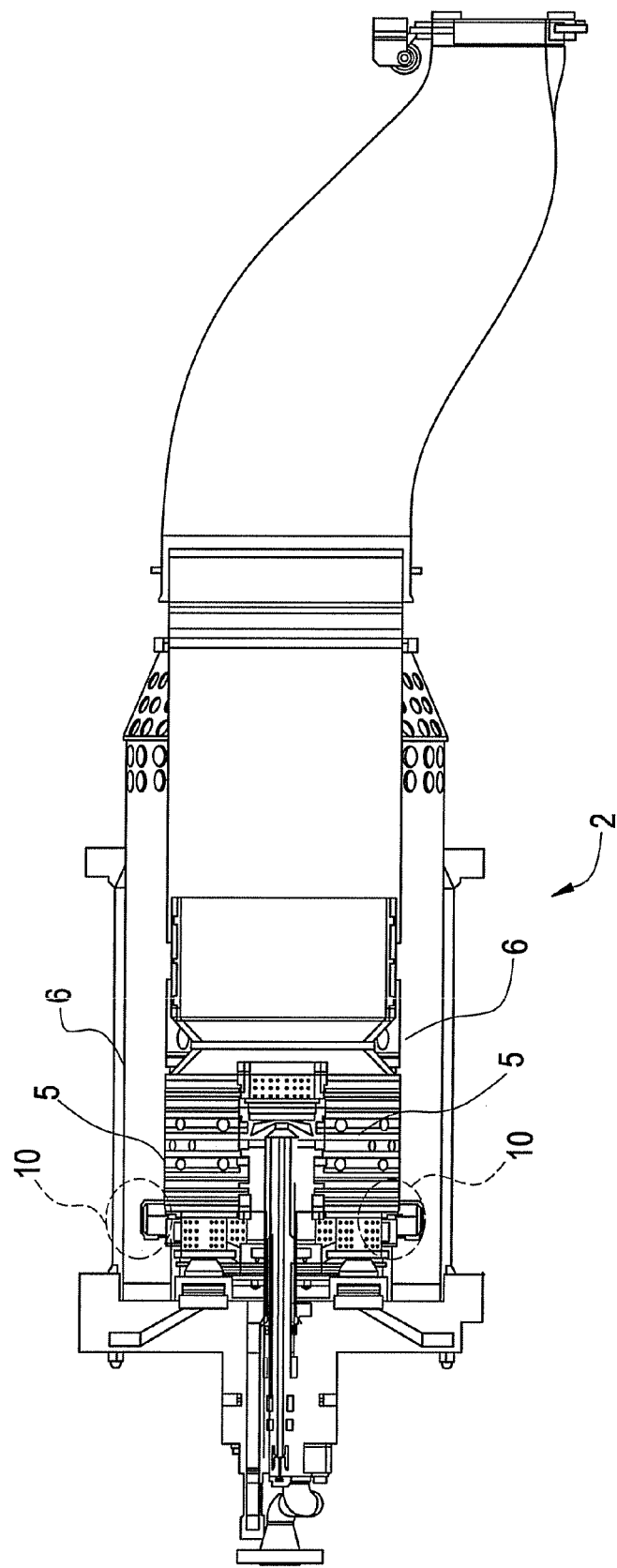
FIG. 1 depicts a cross section of aspects of a combustion system.

Referring now to FIG. 1, there is shown a cross section of aspects of a combustion system 2. The combustion system 2 generally includes a liner 5 and a flow sleeve 6. The liner 5 and the flow sleeve 6 are positioned relative to each other during assembly by use of a plurality of liner stops 10. In some embodiments, the combustion system 2 is generally cylindrical, and includes three liner stops 10, each liner stop 10 being about 120 degrees from the other liner stops 10, in order to provide for relatively even alignment of the liner 5 and the flow sleeve 6. One skilled in the art will recognize that any number of liner stops 10 and distribution of the liner stops 10 may be used.

With reference to FIG. 2 through FIG. 4, the liner stop 10 generally includes three components. A first component, shown in FIG. 2, is a female component 20. A second component, shown in FIG. 3, is a male component 30. A third component, shown in FIG. 4 is an insert 40. Each one of these components is now described in greater detail.

Referring to the embodiment depicted in FIG. 2, the female component 20 generally includes a machined cutout or "saddle" 25. In this embodiment, the saddle 25 includes orthoganally disposed walls. The orthoganally disposed walls include a first sidewall 21, an orthoganally disposed floor 24, an orthoganally disposed second sidewall 23 and an orthoganally disposed backwall 22. In this embodiment, the first sidewall 21 and the second sidewall 23 are generally parallel to each other, and form the saddle therebetween. The female component 20 typically include mounting features 26 for mounting to the flow sleeve 6 (or the liner 5, as the case may be). In various embodiments, the female component 20 is fabricated from materials that withstand thermal, environmental and mechanical stress during operation of the combustion system 2. Exemplary materials include, without limitation, a cobalt super-alloy, a nickel super-alloy, an iron super-alloy, stainless steel and carbon steel.

Referring to the embodiment depicted in FIG. 3, the male component 30 includes a design for cooperation with the female component 20. That is, the male component 30 also includes a plurality of walls adapted for fitting into the saddle 25. For example, in this embodiment, the male component 30 includes a tab 35 of dimensions that correlate to the saddle 25. The tab 35 includes a top side 34, an orthoganally disposed first sidewall 33, an orthoganally disposed bottom side 37, and an orthoganally disposed second sidewall 31 (that is also orthoganally disposed to the top side 34). The first sidewall 33 and the second sidewall 31 are generally parallel to each other, while the top side 34 and the bottom side 37 are generally parallel to each other. Between the parallel walls (31, 33) and sides (34, 37) lies the material that forms the tab 35. The tab 35 includes a face 32 that is generally mateable with the backwall 22 of the saddle 25. The male component 30 typically include mounting features 36 for mounting to the liner 5. In this example, the mounting features 26 include an arcuate backside to allow the stop 10 to fit tightly against liner welding surface for welding to the liner 5. In various embodiments, the male component 30 is fabricated from materials that withstand thermal, environmental and mechanical stress during operation of the combustion system 2. Exemplary materials include, without limitation, a cobalt super-alloy, a nickel super-alloy, an iron super-alloy, stainless steel and carbon steel.

Referring to the embodiment depicted in FIG. 4, the insert 40 includes a design that allows the embodiment to be attached to the male component 30. In this embodiment, the insert 40 includes a first springwall 41, an orthoganally disposed bottom member 44, and an orthoganally disposed second springwall 43. In this embodiment, the first springwall 41 and the second springwall 43 include a design providing a leaf spring in each springwall 41, 43. The insert 40 is generally formed from a continuous piece of metal suited for use in the insert 40. Exemplary materials include, without limitation, forms and alloys of hardened steel and various types of composite materials. The insert 40 may include one or more layers of material. In some embodiments, the insert 40 is a double layered leaf spring. In general, the insert 40 is flexible.

The insert 40 may include a coating, such as a wear coating for wear mitigation.

During initial assembly of the liner stop 10, at least one female component 20 is coupled to the flow sleeve 6. Corresponding male components 30 are coupled to the liner 5. (Of course, the components 20, 30 may be reversed). In exemplary embodiments, the components 20, 30 are welded to the respective portion of the combustion system 2.

Figure 5:
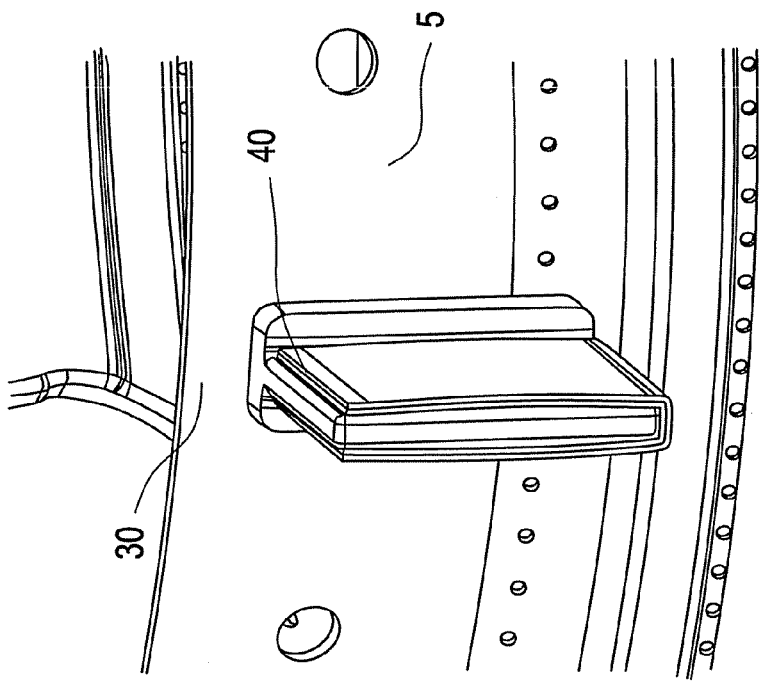
FIG. 5 depicts a liner stop for securing a liner of the combustion system.

In some embodiments, once the male component 30 is installed, the insert 40 is attached onto the male component 30. In one embodiment, the insert 40 is attached by welds to the tab 35. For example, at least one weld may be disposed, along the bottom member 44. In some other embodiments, the insert 40 may be clamped onto the male component 30 prior to installation of the male component 30. Reference may be had to FIG. 5.

In FIG. 5, the insert 40 is shown as disposed over the male component 30.

Figure 6:
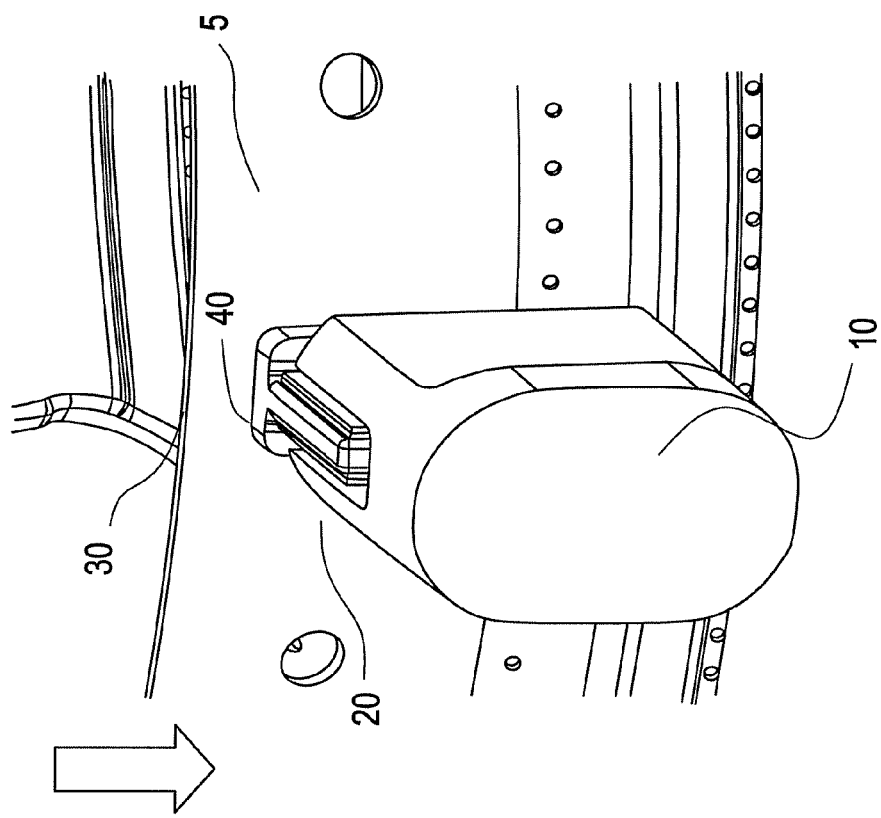
FIG. 6 depicts a male component and an insert of the liner system.

Once the male component 30 and the female component 20 are installed and ready for assembly of the combustion system 2, the liner 5 is inserted into the flow sleeve 6. The male components 30 and the female components 20 are aligned such that progressive insertion of the liner 5 results in the tab 35 being disposed into the saddle 25. Reference may be had to FIG. 6.

With the presence of the insert 40, the force needed to install the tab 35 grows progressively in accordance with a spring force provided by each insert 40. Once installed, the spring force provided by each insert 40 provides retention and alignment of the liner 5 and the flow sleeve 6.

Figure 7:
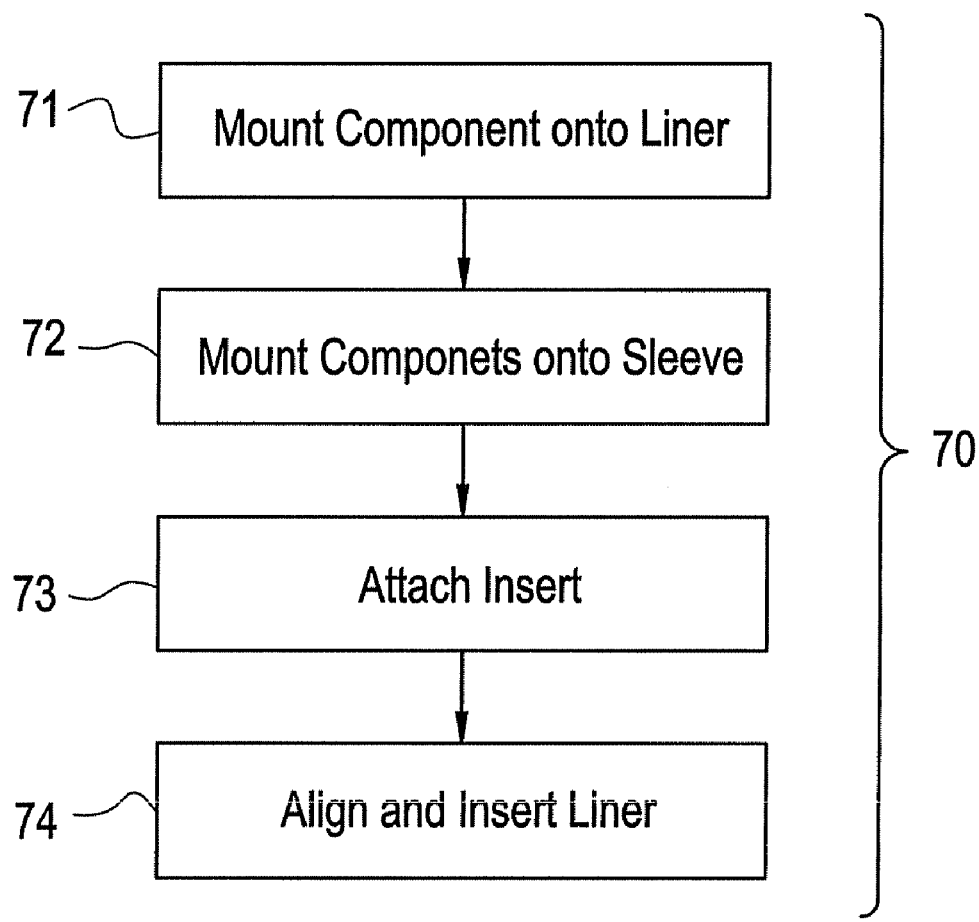
FIG. 7 is a flow chart providing an exemplary method for installing the liner of the combustion system.

Referring now to FIG. 7, a method 70 for installing the liner generally calls for installing a first component 71 (one of the male component 30 and the female component 20) onto the liner 5, installing a second component 72 onto the sleeve 6, attaching the insert 73, and then aligning and inserting the liner 74. Of course, one skilled in the art will recognize a variety of limitations may be had, for example, in the performance of these tasks, as well as the use of the various components. Accordingly, this method 70 is merely exemplary and is not limiting of the teachings herein.

Compensation for wear between the female component 20 and the male component 30 is greatly reduced because vibratory motion between components 20 and 30 is dampened as a result of the insert 40. That is, the insert 40 absorbs a portion of the vibratory energy, decreases the wear causing relative motion between the female component 20 and the male component 30.

Use of the liner stop 10 provides for liner retention in the x-direction and y-direction, as seen in FIG. 2. When the male component 30 is seated in the female component 20, the spring walls 41 and 43 of the insert 40 apply a force on the first and second sidewalls 21 and 23 of the female component 20. This spring force suspense the male and female components 30 and 20 in position relative to each other in the y-direction with a relatively small amount of motion. In the x-direction, the male and female components 30 and 20 are held in position relative to each other by friction between the spring walls 41 and 43 of the insert 40 and the first and second sidewalls 21 and 23 of the female component 20 imposed by the spring force applied by spring walls 41 and 43. Movement is limited to the insertion direction (x-direction). The contacting surface area is also beneficial for distributing the vibration and other dynamic forces that are transferred between the flow sleeve 6 and the combustion liner 5.

One skilled in the art will recognize that the male component 30 and the female component 20 may include more or fewer surfaces, and that the insert 40 may be designed to cooperate with these other embodiments. Accordingly, the embodiment provided herein is merely exemplary and is not limiting of the teachings herein.

While the invention has been described with reference to an exemplary embodiment, it will be understood that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A liner stop for retaining a liner within a sleeve of a combustion system, the liner stop comprising:
   a female component comprising a saddle, the female component adapted for coupling to one of the liner and the sleeve;
   a male component comprising a tab for insertion into the saddle, the male component adapted for coupling to an opposite one of the liner and the sleeve; and
   an insert comprising a spring wall attached to the tab such that the dampening of vibration is induced between the male and female components.

2. The liner stop as in claim 1, wherein the saddle comprises a first sidewall, an orthoganally disposed floor, an orthoganally disposed second sidewall and an orthoganally disposed backwall.

3. The liner stop as in claim 2, wherein the first sidewall and the second sidewall are generally parallel to each other.

4. The liner stop as in claim 1, wherein the female component comprises mounting features for mounting to one of the liner and the sleeve.

5. The liner stop as in claim 1, wherein the tab comprises a top side, an orthoganally disposed first sidewall, an orthoganally disposed bottom side, and an orthoganally disposed second sidewall that is orthoganally disposed to the top side.

6. The liner stop as in claim 5, wherein the top side and the bottom side are generally parallel to each other, and the first sidewall and the second sidewall are generally parallel to each other.

7. The liner stop as in claim 1, wherein at least one of the female component and the male component are fabricated from at least one of a cobalt super-alloy, a nickel super-alloy, an iron super-alloy, stainless steel and carbon steel.

8. The liner stop as in claim 1, wherein the insert comprises a first springwall, an orthoganally disposed bottom member, and an orthoganally disposed second springwall.

9. The liner stop as in claim 8, wherein at least one springwall provides a leafspring.

10. The liner stop as in claim 1, wherein the insert is adapted for being welded to the tab.

11. The liner stop as in claim 1, wherein the insert comprises at least one of an alloy of hardened steel and a composite material.

12. The liner stop as in claim 1, wherein the insert comprises at least one layer of material.

13. The liner stop as in claim 1, wherein the insert further comprises a wear coating thereon.

14. A method for inserting a liner into a sleeve of a combustion system, the method comprising:
- installing one of a male component and a female component onto an outer surface of the liner;
- installing an opposite one of the male component and the female component onto an inner surface of the sleeve;
- installing an insert comprising a spring wall onto a tab of the male component such that dampening of vibration is induced between the male and female components; and
- inserting the liner into the sleeve such that the tab becomes disposed within a saddle of the female component.

15. The method as in claim 14, further comprising placing a wear coating upon an outer surface of the insert.

16. A combustion system comprising a liner inserted into a sleeve, the system comprising:
- a plurality of liner stops disposed between the liner and the sleeve, each liner stop comprising a female component comprising a saddle, the female component adapted for coupling to one of the liner and the sleeve;
- a male component comprising a tab for insertion into the saddle, the male component adapted for coupling to an opposite one of the liner and the sleeve; and
- an insert comprising a spring wall attached to the tab and ensuring retention of the liner within the sleeve and dampening of vibration is induced when the tab is disposed within the saddle.

* * * * *